(No Model.)

L. B. MORGAN.
BREAD RAISING OVEN.

No. 254,095. Patented Feb. 21, 1882.

Witnesses:
W. Klein
O. J. Bailey

Inventor:
Lewis B. Morgan
by J. L. Zerbe
Atty

UNITED STATES PATENT OFFICE.

LEWIS B. MORGAN, OF WEST LIBERTY, WEST VIRGINIA, ASSIGNOR OF ONE-HALF TO JOHN E. WAYT, OF SAME PLACE.

BREAD-RAISING OVEN.

SPECIFICATION forming part of Letters Patent No. 254,095, dated February 21, 1882.

Application filed November 28, 1881. (No model.)

*To all whom it may concern:*

Be it known that I, LEWIS B. MORGAN, of West Liberty, in the county of Ohio and State of West Virginia, have invented a new and useful Improvement in Bread-Raising Ovens, which improvement is fully set forth in the following specification and accompanying drawings, in which—

Figure 1:
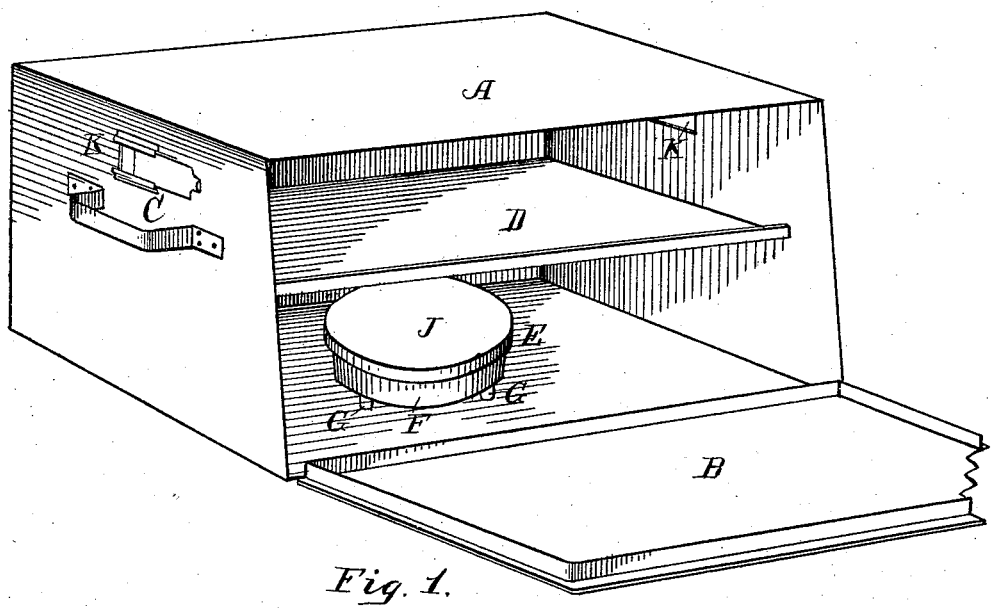
Figure 2:
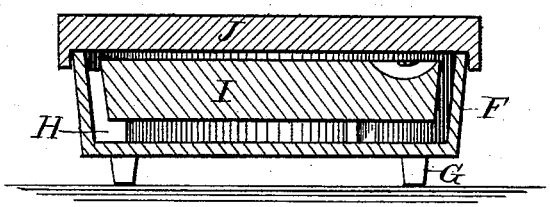

Figure 1 represents a perspective view of the oven proper together with the heating apparatus in position, and Fig. 2 a sectional view of the heating apparatus.

The object and purpose of my invention is to facilitate the raising of bread-dough previous and preparatory to baking the same into bread.

In the accompanying drawings, A represents the top of the rectangular oven, which said oven is to be constructed of tin, sheet-iron, or other suitable material.

B is the door of the oven, which works on hinges, and may be opened and closed at pleasure.

C is a handle, of which there are two, one at each end of the oven, for lifting and moving the same; D, a sliding shelf for receiving the pans or vessels containing the dough; E, the bottom of the oven proper; F, a circular pan or vessel, of cast-iron or other suitable metal, resting on three legs, G G, containing a movable solid circular body, of iron or other suitable metal, fitting loosely into and almost filling the said pan or vessel, the whole being covered by a movable lid larger than the vessel, having a rim or flange, E, projecting over the outer sides and fitting closely thereto, all round the outer sides of the said vessel.

The invention relates particularly to the rectangular oven A C B, the adjustable shelf D, the heating pan or vessel F, and the circular solid body, of iron or other suitable metal or material, fitting loosely into the heating pan or vessel F and resting upon brackets or shoulders on the inside of the pan or vessel, which hold said solid body or disk free and clear of all parts of the interior of the pan or vessel, thus allowing the free circulation of air all around the interior of the said pan or vessel between it and the sides of the said solid circular body or disk, the top thereof being in contact with the interior of the movable lid J and on a plane with the top of the sides of the said pan or vessel.

Fig. 2 represents a sectional view of this heating pan or vessel closed and all of its parts in proper position. F, the sides of the heating-pan, tapers slightly inward and downward.

G represents one of the legs. H is one of the brackets or shoulders on the inside of the pan, which supports the circular body or disk. The solid circular body or disk is to be heated to the proper temperature and placed in the heating pan or vessel F, which is then closed by the lid J and the whole put into the oven. The pans or vessels containing the dough are then placed on the shelf D and the door B of the oven closed, thus retaining the heat within the oven and sending it round and through the dough to be raised.

K K represent ventilators or registers for the oven, placed at any desired point in the ends.

Having described my invention, what I claim as new, and desire to secure by Letters Patent, is—

The combination of the oven A B C, having the sliding shelf D, with the heating pan or vessel F, having the movable lid J, the inside shoulders or brackets H, and the removable circular body or disk I, as shown, all constructed and arranged substantially as and for the purpose herein set forth.

In testimony that I claim the foregoing I have hereunto set my hand this 18th day of November, A. D. 1881, in the presence of witnesses.

LEWIS B. MORGAN.

Witnesses:
J. M. SHORTS,
BROOKS HEDGES.